US012808829B2

(12) United States Patent
Dierker et al.

(10) Patent No.: US 12,808,829 B2
(45) Date of Patent: Nov. 24, 2026

(54) SANITARY SINGLE-USE PROCESS CONNECTION WITH INTEGRAL WET STORAGE FOR USE WITH PROCESS SENSORS

(71) Applicant: Rosemount Inc., Shakopee, MN (US)

(72) Inventors: Andrew S. Dierker, Minnetonka, MN (US); Tyrel L. Ruch, Saint Paul, MN (US); Jinbo Hu, Minnetonka, MN (US); Taufiq Ahmed, Apple Valley, MN (US); Chad M. McGuire, Shakopee, MN (US)

(73) Assignee: Rosemount Inc., Shakopee, MN (US)

( * ) Notice: Subject to any disclaimer, the term of this patent is extended or adjusted under 35 U.S.C. 154(b) by 1195 days.

(21) Appl. No.: 17/749,481

(22) Filed: May 20, 2022

(65) Prior Publication Data

US 2022/0373496 A1 Nov. 24, 2022

Related U.S. Application Data

(60) Provisional application No. 63/191,597, filed on May 21, 2021.

(51) Int. Cl.

| | |
|---|---|
| ***G01N 27/28*** | (2006.01) |
| ***F16L 41/16*** | (2006.01) |
| ***G01N 27/416*** | (2006.01) |

(52) U.S. Cl.

CPC ............ *G01N 27/283* (2013.01); *F16L 41/16* (2013.01); *G01N 27/4167* (2013.01)

(58) Field of Classification Search

CPC .. G01N 27/283; G01N 27/4167; G01D 11/30; G01D 11/245; F16L 41/008; G01F 15/185

See application file for complete search history.

(56) References Cited

U.S. PATENT DOCUMENTS 4,842,709 A * 6/1989 Mayeaux ............... G01N 27/38 73/335.02
5,011,587 A * 4/1991 Schmidt ................. G01N 27/38 204/409

(Continued)

FOREIGN PATENT DOCUMENTS

| | | |
|---|---|---|
| JP | S61120956 A | 6/1986 |
| JP | H08285811 A | 11/1996 |
| JP | 2019525146 A | 9/2019 |

OTHER PUBLICATIONS

Application and Drawings filed for U.S. Appl. No. 17/749,619, filed May 20, 2022, 19 pages.

(Continued)

*Primary Examiner* — Tran M. Tran

(74) *Attorney, Agent, or Firm* — Christopher R. Christenson; Kelly, Holt & Christenson, P.L.L.C.

(57) ABSTRACT

A process fluid connector for a single-use process fluid sensing system is provided. The process fluid connector includes a pair of process fluid connections, each process fluid connection being configured to couple to a cooperative process fluid coupling. A process fluid conduit section is operably coupled to each of the process fluid connections. A sensor attachment port is coupled to the process fluid conduit section and is configured to receive and mount a process fluid sensor. A retractable fluid chamber is coupled to the process fluid conduit section and configured to provides wet storage for sensing component(s) of the process fluid sensor. A process fluid sensing system using the process fluid connector is also provided.

20 Claims, 12 Drawing Sheets

(56) References Cited

U.S. PATENT DOCUMENTS

| | | | | |
|---|---|---|---|---|
| 5,139,641 | A * | 8/1992 | Neukum | G01N 27/301 204/414 |
| 6,131,473 | A * | 10/2000 | Hoffman | G01N 17/046 73/866.5 |
| 6,495,012 | B1 * | 12/2002 | Fletcher | G01N 27/301 204/420 |
| 6,640,658 | B1 * | 11/2003 | Guerrero | G01D 11/30 73/866.5 |
| 6,773,678 | B2 * | 8/2004 | Cummings | G01N 27/283 422/68.1 |
| 6,926,814 | B2 * | 8/2005 | Koenemann | G01N 27/283 204/402 |
| 7,594,449 | B2 * | 9/2009 | Tottewitz | G01D 11/30 73/866.5 |
| 8,578,798 | B2 * | 11/2013 | Pfauch | G01N 27/283 73/866.5 |
| 8,828,202 | B2 | 9/2014 | Feng | |
| 8,900,855 | B2 * | 12/2014 | Feng | C12M 23/14 435/297.1 |
| 9,046,501 | B2 * | 6/2015 | Loebbert | C12M 41/40 |
| 9,091,570 | B2 * | 7/2015 | Pfauch | G01D 11/245 |
| 9,134,266 | B2 * | 9/2015 | Thrier | F15D 1/00 |
| 9,146,138 | B2 * | 9/2015 | Hanko | G01N 27/333 |
| 9,194,685 | B2 * | 11/2015 | Schlereth | G01D 11/245 |
| 9,274,080 | B2 * | 3/2016 | Auerswald | G01N 27/36 |
| 9,404,785 | B2 * | 8/2016 | Wunderlich | G01N 27/283 |
| 9,562,819 | B2 | 2/2017 | Fadell et al. | |
| 9,868,930 | B2 * | 1/2018 | Adkins | G01N 27/283 |
| 9,897,563 | B2 * | 2/2018 | Silveri | G01N 27/06 |
| 9,909,909 | B2 | 3/2018 | Schumacher | |
| 10,209,105 | B2 * | 2/2019 | Schneider | G01N 27/283 |
| 10,261,042 | B2 * | 4/2019 | Lopes | G01N 27/30 |
| 10,359,415 | B2 | 7/2019 | Schumacher | |
| 10,502,650 | B2 * | 12/2019 | Gagne | G01L 19/0023 |
| 10,584,309 | B2 | 3/2020 | Fadell et al. | |
| 10,598,626 | B2 * | 3/2020 | Wunderlich | G01N 27/4161 |
| 10,823,713 | B2 * | 11/2020 | Leveille | G01N 30/32 |
| 10,836,990 | B2 | 11/2020 | Fadell et al. | |
| 10,859,196 | B2 * | 12/2020 | Postberg | G01D 11/30 |
| 10,921,204 | B2 | 2/2021 | Pepin et al. | |
| 10,970,614 | B2 | 4/2021 | Fadell et al. | |
| 11,046,927 | B2 | 6/2021 | Hu et al. | |
| 11,085,894 | B2 * | 8/2021 | Ruch | B08B 1/165 |
| 11,384,325 | B2 | 7/2022 | Schumacher et al. | |
| 11,428,610 | B2 * | 8/2022 | Pfauch | G01F 23/64 |
| 11,566,958 | B2 * | 1/2023 | Patch | G01L 5/161 |
| 11,667,880 | B2 * | 6/2023 | Hu | C12M 23/00 422/68.1 |
| 12,031,877 | B2 * | 7/2024 | Sievert | G01N 27/4167 |
| 12,259,354 | B2 * | 3/2025 | Garrahy | G01N 27/283 |
| 12,313,586 | B2 * | 5/2025 | Garrahy | C12M 41/26 |
| 2006/0249386 | A1 * | 11/2006 | Bower | G01N 27/4035 204/400 |
| 2008/0053255 | A1 | 3/2008 | Furey et al. | |
| 2008/0283399 | A1 * | 11/2008 | Feng | G01N 27/36 204/408 |
| 2016/0327416 | A1 | 11/2016 | Gagne et al. | |
| 2017/0059518 | A1 | 3/2017 | Feng et al. | |
| 2017/0166852 | A1 | 6/2017 | Feng | |
| 2019/0011072 | A1 | 1/2019 | Postberg | |
| 2019/0264161 | A1 * | 8/2019 | Hu | C12M 41/26 |
| 2019/0264163 | A1 | 8/2019 | Dierker et al. | |
| 2020/0271610 | A1 | 8/2020 | Ruch et al. | |
| 2021/0189319 | A1 | 6/2021 | Hu et al. | |
| 2022/0099514 | A1 | 3/2022 | Willcox et al. | |

OTHER PUBLICATIONS

International Search Report and the Written Opinion for International Application No. PCT/US2022/030240, dated Aug. 22, 2022, 12 pages.

Office Action for Canadian Patent Application No. 3219699, dated Jan. 16, 2025, 3 pages.

Supplementary Search Report for European Patent Application No. 22805567.9, dated Feb. 17, 2025, 8 pages.

First Office Action for Japanese Patent Application No. 2023-571892, Dated Oct. 29, 2024, 18 pages including English Translation.

First Office Action for Chinese Application No. 202280036463.6, mailed May 18, 2026, 13 pages.

Office action for Indian application No. IN202327074718 mailed Apr. 28, 2026, 8 pages.

* cited by examiner

SANITARY SINGLE-USE PROCESS CONNECTION WITH INTEGRAL WET STORAGE FOR USE WITH PROCESS SENSORS

CROSS-REFERENCE TO RELATED APPLICATIONS

The present application is based on and claims the benefit of U.S. Provisional Patent Application Ser. No. 63/191,597 filed May 21, 2021; the content of which application is hereby incorporated by reference in its entirety.

BACKGROUND

During the past two decades, single-use or disposable bioprocessing systems have gained significant momentum in replacing stainless-steel systems in biopharma manufacturing. In contrast to the conventional systems that are constructed with stainless-steel equipment, single-use systems rely on highly engineered polymers and come pre-sterilized via Gamma irradiation. For end users, they offer several significant advantages including reduced initial investment, elimination of complex processes of pre-cleaning, sterilization, and validation, as well as improved process turnaround time. As a result, single-use bioprocessing systems have been adopted from initial R&D laboratories to large-scale commercial pharmaceutical manufacturing at an accelerated pace.

pH is a critical process parameter in many processes of biopharma manufacturing. In upstream bioreactor applications, medium culture pH is continuously monitored and controlled within a narrow physiological range and deviation from this ideal pH range can negatively affect viable cell concentration, protein productivity and quality. Traditional pH sensors used in biopharma manufacturing are based on electrochemical measurement method with a pH sensitive glass electrode and a reference electrode. Due to its high reliability, accuracy, and stability, this is a well-established technology with proven success in biotechnology and pharmaceutical industries.

Conventional pH sensors, however, are designed to be compatible with conventional stainless-steel style bioreactor systems and therefore have several significant limitations when used in single-use systems. First, conventional sensors must be sterilized by the end user using autoclaving, steam-in-place, or clean-in-place procedures. They are generally not compatible with the Gamma irradiation sterilization process as Gamma irradiation could damage their sensing components and lead to undesired performance degradation. To ensure satisfactory accuracy, conventional pH sensors usually require a two-point calibration conducted by end users prior to use, which is cumbersome and adds to complexity in the process. Furthermore, conventional pH sensors usually have a one-year shelf life because the pH sensing glass will age over time, leading to reduced sensor performance. Unfortunately, longer sensor shelf life is a requirement because the sensor could be attached to a plastic bioreactor bag or in a tube set for downstream applications with an expectation of a much longer shelf life.

SUMMARY

A process fluid connector for a single-use process fluid sensing system is provided. The process fluid connector includes a pair of process fluid connections, each process fluid connection being configured to couple to a cooperative process fluid coupling. A process fluid conduit section is operably coupled to each of the process fluid connections. A sensor attachment port is coupled to the process fluid conduit section and is configured to receive and mount a process fluid sensor. A retractable fluid chamber is coupled to the process fluid conduit section and configured to provides wet storage for sensing component(s) of the process fluid sensor. A process fluid sensing system using the process fluid connector is also provided.

DETAILED DESCRIPTION OF ILLUSTRATIVE EMBODIMENTS

To address the limitations for the "upstream" bioreactor bag, a pH sensor was developed that is specifically developed for single-use bioreactor applications. This sensor concept is the basis of the commercial product 550 pH Single-Use Sensor available from the Rosemount group of Emerson Automation Solutions. The single-use pH sensor is compatible with Gamma irradiation sterilization and can be attached to a single-use bioreactor bag to form one assembly. With the incorporation of a unique storage buffer solution, the sensor does not require a two-point calibration by end users and can be one-point standardized using this storage buffer solution. More importantly, the storage buffer solution is in contact with the pH and reference electrodes keeping them wet and fresh while the sensor is stored. This wet storage has led to an increased shelf life of 2 years with outstanding sensor performance including high accuracy, sensitivity, and stability. Through rigorous real-time testing with prototypes that were not aged, 1-year aged and 2-year aged, it was demonstrated that the sensor performance remains at a high level without degradation after 2 years of storage.

Figure 1A:
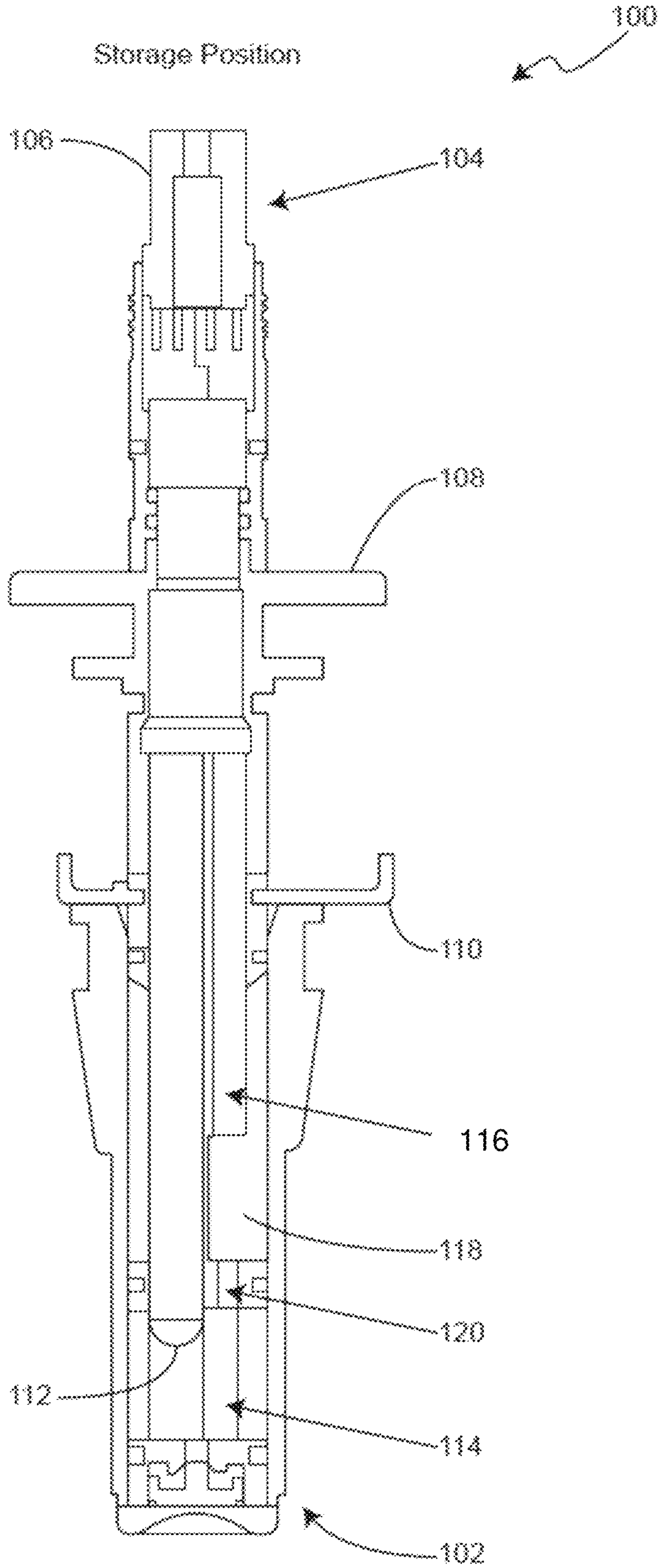
FIGS. 1A and 1B are diagrammatic views of a pH sensor illustrating a storage position and an operating position, respectively.

FIG. 1A is a diagrammatic view of a pH sensor illustrating a storage position. In one example, the pH sensor shown in FIG. 1A is the 550 pH Single Use Sensor. Sensor 100 is generally shown in cross section having a distal end 102 that is generally configured to engage a process, such as a bioreactor bag, and a proximal end 104 having an electrical connector 106 that is configured to couple to instrumentation. Some pH sensors are considered amperometric in that they generate a current indicative of pH. Other types of sensors, such as potentiometric sensors, may generate a potential that indicates the process variable. As used herein, process sensors are intended to include any sensor that has an electrical characteristic that varies with the process variable.

Sensor 100, as shown in FIG. 1A, is provided in a storage position configuration, in which process plunger 108 is spaced from locking member 110. When in the storage configuration, pH sensing glass electrode 112 is maintained within storage chamber 114 which is filled with a buffer solution. As can be seen in FIG. 1A, a reference electrode 116 is provided within electrolyte 118, which electrolyte 118 is configured to electrically couple to a process via reference junction 120. Sensor 100 is maintained in the storage position for both storage, and calibration just prior to operation. This is because the buffer solution in storage chamber 114 has a known pH, and the sensor can be calibrated, or otherwise characterized, by measuring the pH with electrode 112 and comparing the measured value against the known pH of the buffer solution.

Figure 1B:
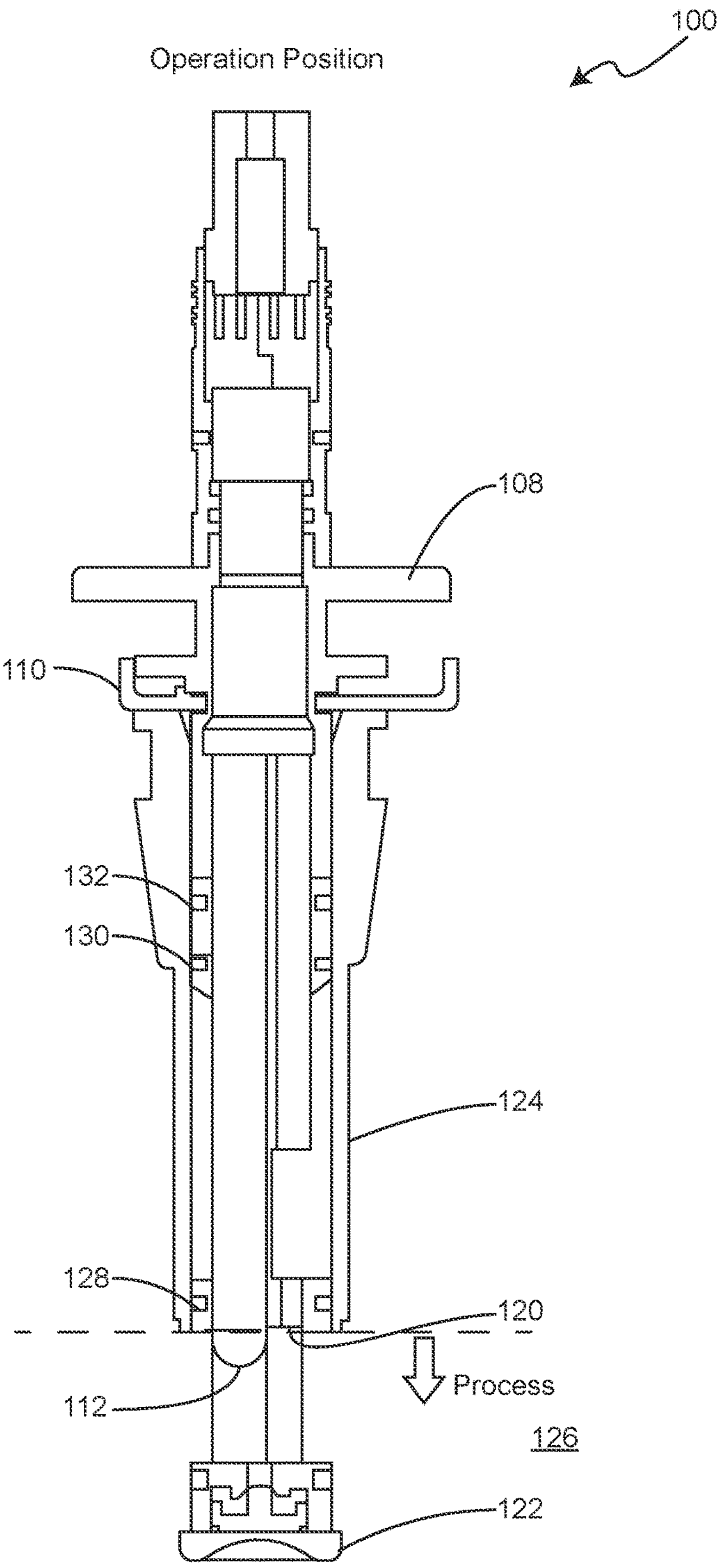

FIG. 1B is a diagrammatic view of pH sensor 100 illustrating an operation position. Contrasting FIGS. 1B and 1A, shows that process plunger 108 has been slid to be proximate locking member 110. This sliding motion has caused end 122 to extend from side wall 124 thereby exposing pH glass electrode 112 to process 126. As can be seen, process 126 is also exposed to reference junction 120. Thus, the sliding motion from the storage position to the operation position, has exposed the wet storage chamber 114 to process 126. In the configuration shown in FIG. 1B, sensor 100 may be used to sense the pH of process fluid, such as a bioreaction fluid, a cell culture or mash.

As shown in FIGS. 1A and 1B, the sliding motion is facilitated by O-rings 128, 130, and 132. These O-rings ensure that the electrolyte and buffer solution are maintained in a sealed arrangement in the storage configuration, and that the electrolyte is still sealed from the process during the operation position. The illustrated sensor provides wet storage for the pH glass and reference junction via a separate storage chamber and sliding sensor assembly that is moved axially within the process connector and into the process upon startup. The sliding sensor assembly provides a reliable measurement at low process pressures. Note, the process connector sleeve remains fixed relative to the process media and the sensor is moved when inserted into the process.

After the cell culture process is complete in the bioreactor bag, the media is moved to the downstream part of the process. Here the media is pushed through filtration phases in small line size tubing assemblies at higher pressures that may be as high as around 60 psi. The downstream tubing assemblies or ‘tube sets’ are provided as pre-assembled, instrumented, and sterilized assemblies. Maintaining the sterility of all internal surfaces of these pharmaceutical assemblies is paramount. In addition, these tube sets have a shelf-life of 2 years just like the upstream/in-bag single-use assemblies. Although downstream process conditions vary dramatically from upstream process conditions the downstream assemblies are also expected to maintain full functionality after two years of storage, just like the upstream assemblies. For pH sensors specifically, this shelf life is attainable via wet pH glass and reference junction storage.

The higher process pressure found in downstream processing may create problems with traditional pH sensors. Some approaches for dealing with these higher pressures include pressurizing the internal reference electrolyte. However, the wet storage mechanism of some pH sensors is not compatible with internal reference pressurization. For example, it has been demonstrated that under internal reference pressure, the O-ring seals, such as seals 128, 130, and 132 that enable the sliding movement (shown in FIG. 1B) can be a leak path through which the internal reference electrolyte can escape.

Figure 2A:
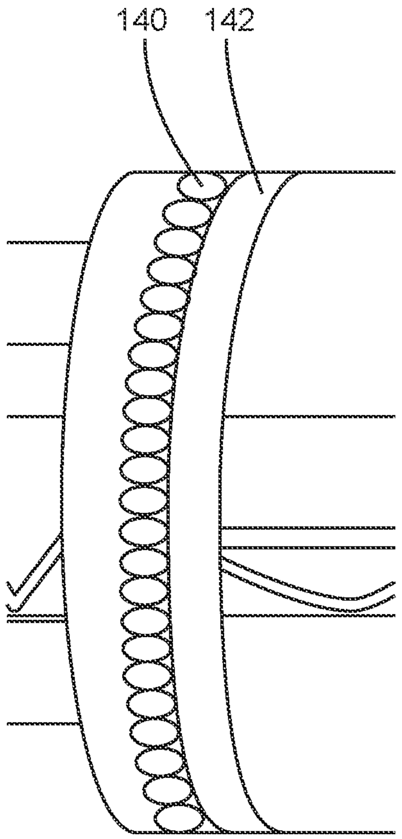
FIGS. 2A and 2B are enlarged views of a single-use pH sensor illustrating leakage at an O-ring seal where an internal reference is pressurized.
Figure 2B:
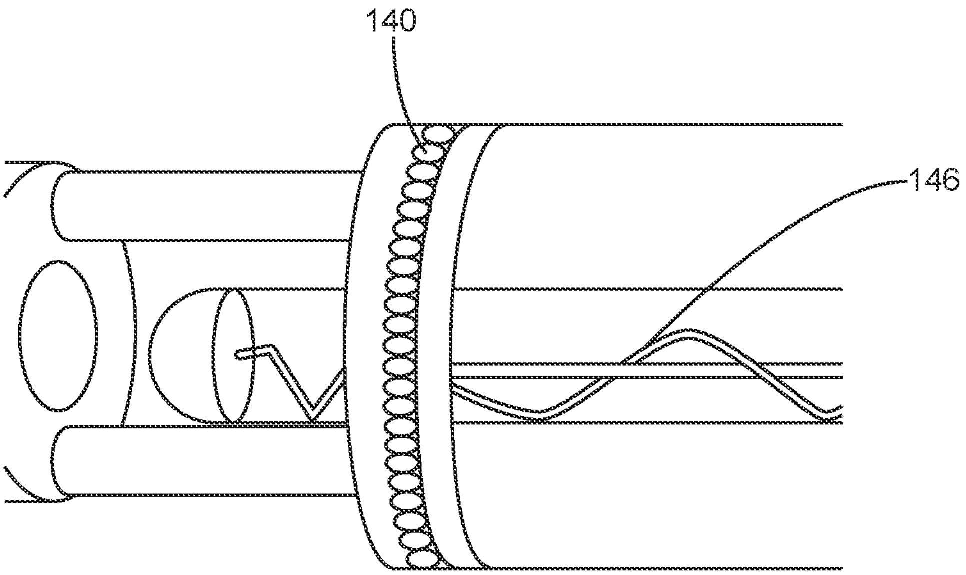

FIGS. 2A and 2B are enlarged views of a single-use pH sensor illustrating leakage at an O-ring seal 142 when an internal reference chamber is pressurized. As shown, sensor electrolyte is pushed past O-ring seal 142 and into the measurement chamber/environment. As a result, the pH sensor may behave erratically with unpredictable signal spikes or drifts, especially when sensor is exposed to external process pressures that are less than the internal reference pressure.

Figure 3:
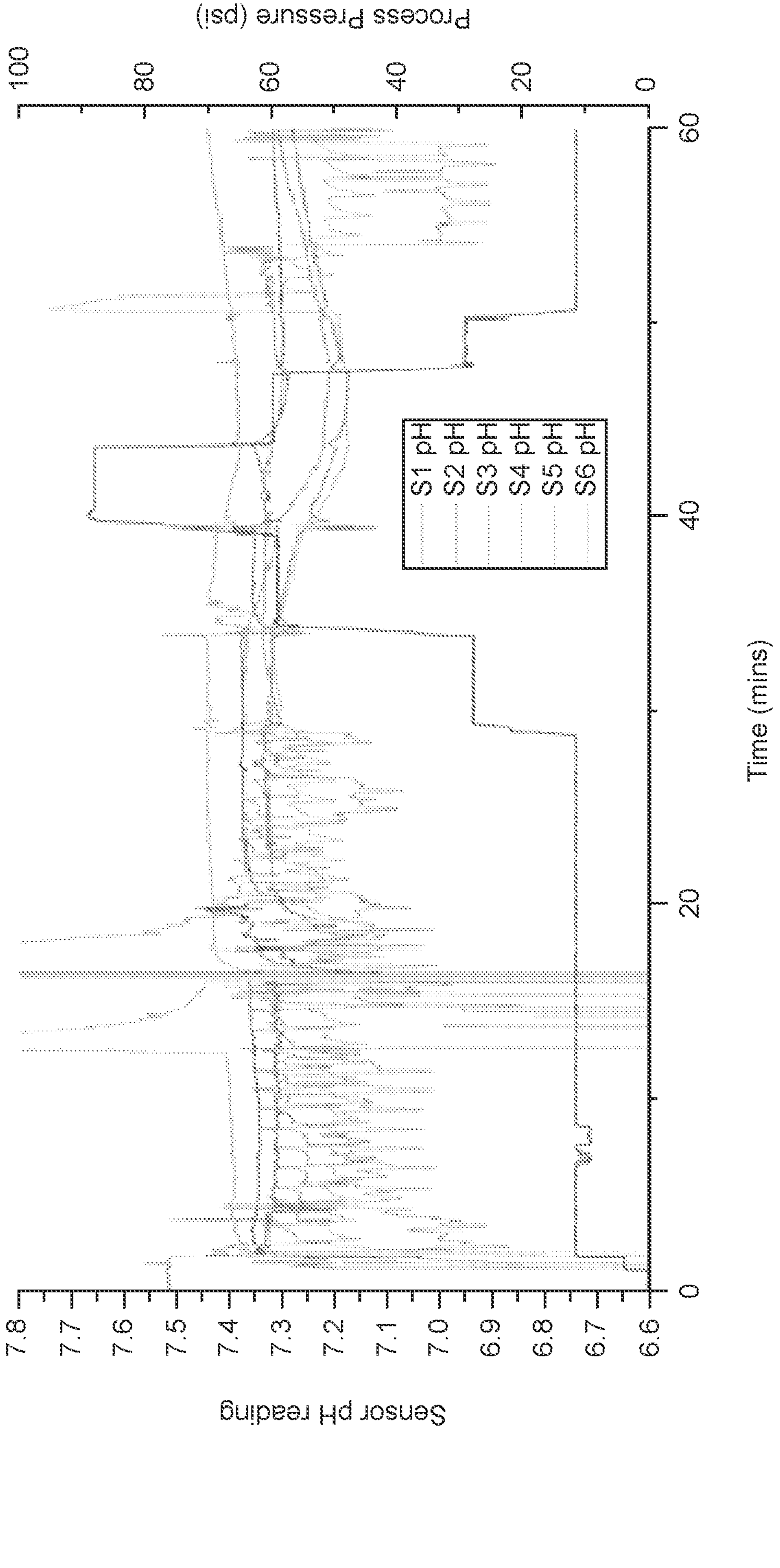
FIG. 3 is a chart illustrating sensor pH reading over time for various sensors and at various pressures.

FIG. 3 is a chart illustrating sensor pH reading over time for various sensors and at various pressures. The values shown in FIG. 3 show that erratic values can occur at process pressures less than 30 psi.

Embodiments described herein generally stem from an appreciation of the limitations of commercially-available upstream pH sensors, and the mechanism of such limitations. More particularly, in order to accommodate downstream pH sensing, it is important for the reference electrolyte to be pressurized such that a small flow of electrolyte into process solution is ensured even when the downstream process solution is at elevated pressures, sometimes as high as 60 PSI. However, simply pressurizing a reference electrolyte in a known pH sensing structure that uses O-rings and accommodates sliding function between storage and operational configurations, may not meet the shelf-life requirements demanded by single-use, sanitary industries.

To resolve this problem, the sliding reference chamber is replaced with a fixed configuration with no O-ring connection to the process for the downstream pH sensor.

Figure 4:
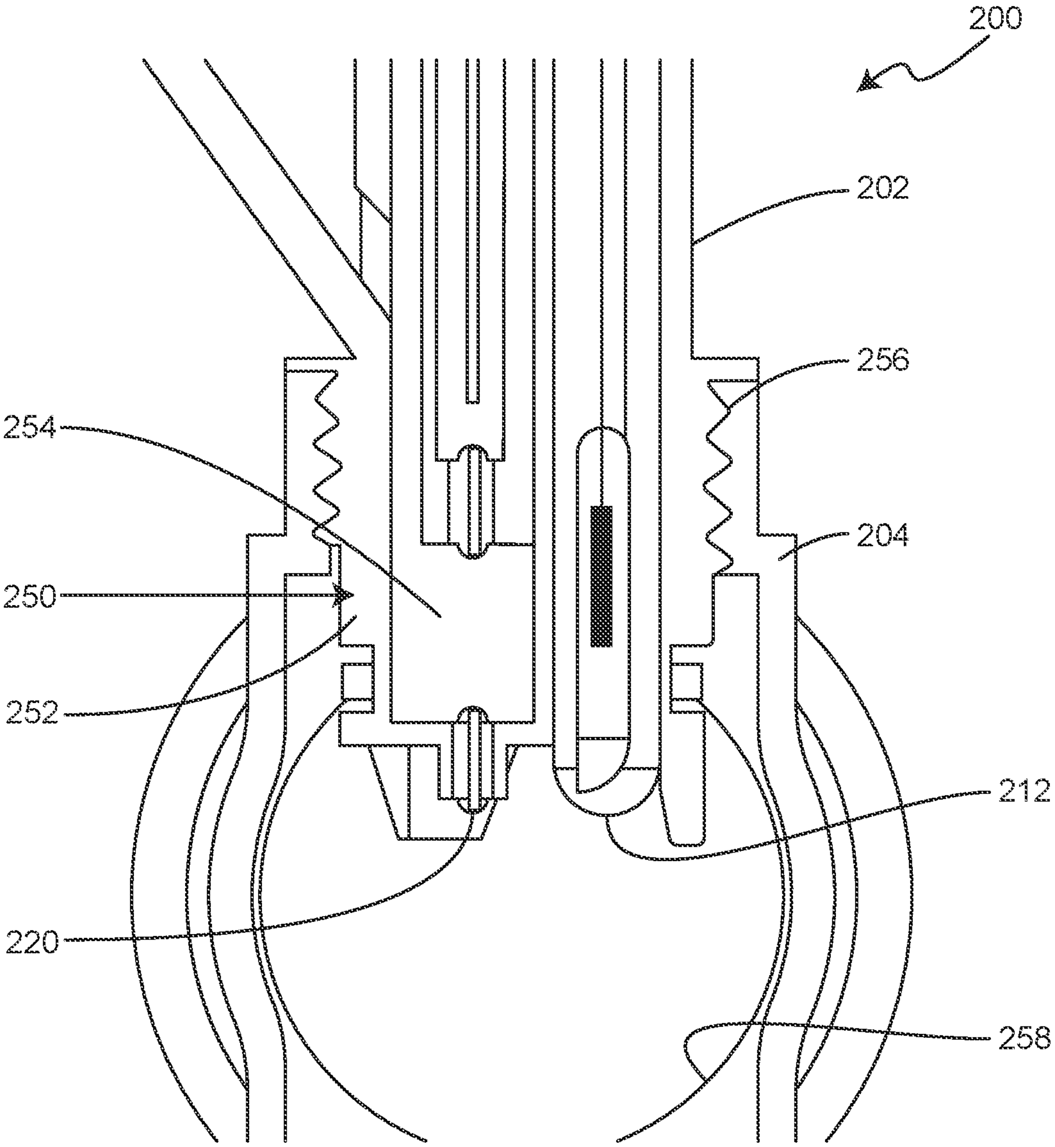
FIG. 4 illustrates a fixed position sensor with no O-rings between the process and the reference chambers in accordance with one embodiment.

FIG. 4 illustrates a fixed portion of a position pH sensor 200 with no O-rings between the process and the reference chambers in accordance with one embodiment. As shown in FIG. 4, a portion of pH sensor 200 includes a pH sensor element 202 that threadably engages process connector 204. As a downstream pH sensor system, process connector 204 is able to couple to hose or tube sets of the bioreactor system. Sensor 200 includes a glass pH electrode 212 as well as a reference junction 220. As shown at reference numeral 250, a solid polymeric reference chamber housing 252 is employed to house reference electrolyte 254. In one example, polymeric housing 252 is formed of plastic. In the illustrated example, pH sensor element 202 is a fixed position pH sensor in that it does not accommodate the slidable motion to switch between storage and operating configurations, such as sensor 100 in FIGS. 1A and 1B. Instead, sensor 202 is threadably engaged to process connector 204 at threaded interface 256 and the location of reference junction 220 and pH glass electrode 212 within aperture 258 of process connector 204 is fixed. After removing the O-ring connection, measurement values are dramatically improved.

Figure 5:
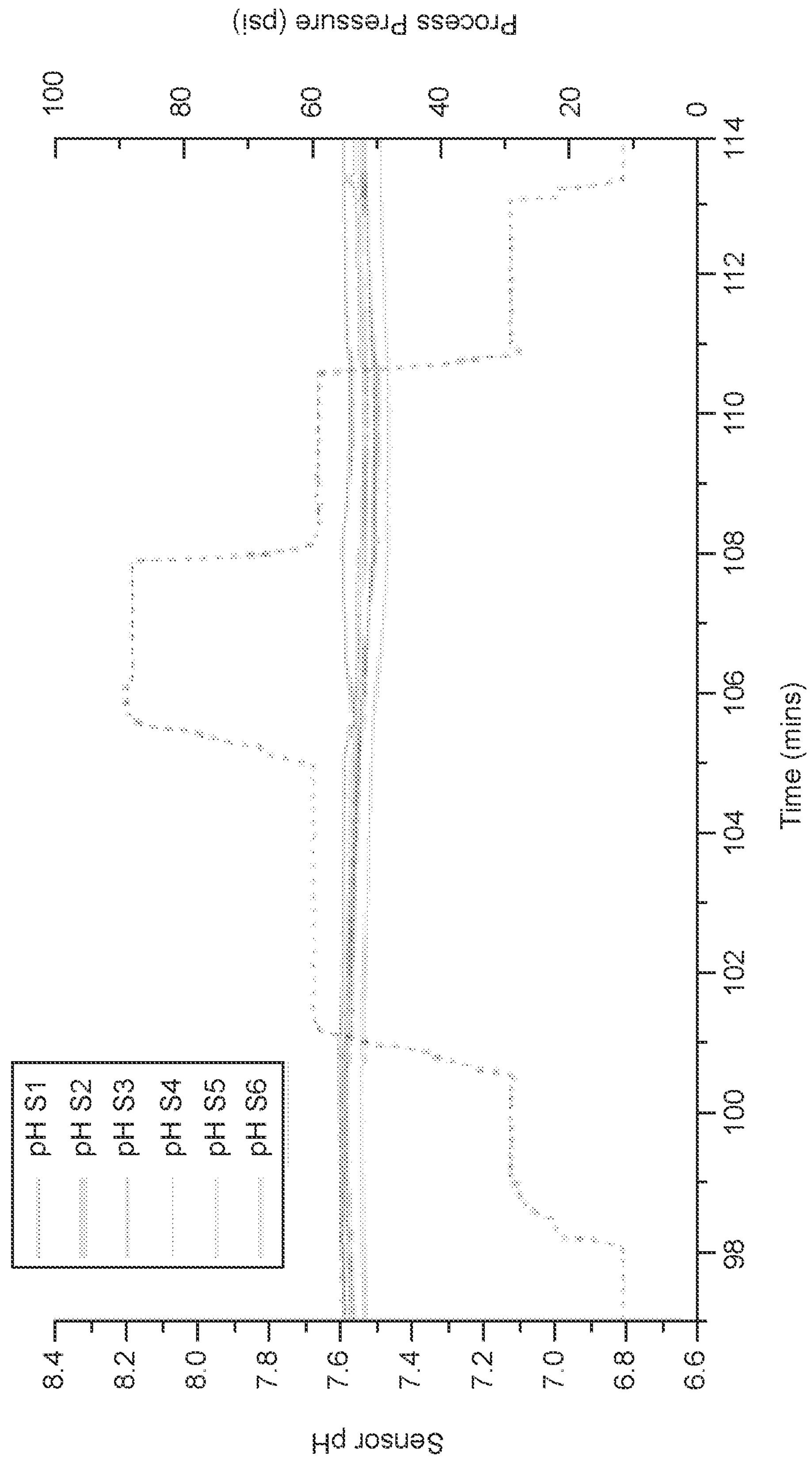
FIG. 5 is a chart illustrating various sensor measurements over time at various process pressures.

FIG. 5 is a chart illustrating various sensor measurements over time at various process pressures. The test results shown in FIG. 5 were based on a pH sensor having an internal reference pressure of 60 psi—with O-ring seals replaced with solid epoxy seals. Note, FIG. 5 shows very steady, consistent pH values observed across process pressures ranging from 10 to 90 psi. Contrasting FIGS. 3 and 5, shows that removal of the O-ring seals results in a significantly improved pH sensor when interacting with a pressurized process. However, the seal change leads to the requirement of a new wet storage mechanism.

At high process pressures, the storage chamber in some known single-use pH sensors that employ sliding O-ring seals does not work. To provide stable readings, the O-rings that separate the reference chamber from the process should be eliminated. Since the sliding nature of the inner plunger assembly of this sensor is what provides that wet storage capability, a new method for enabling wet storage is needed.

Figure 6:
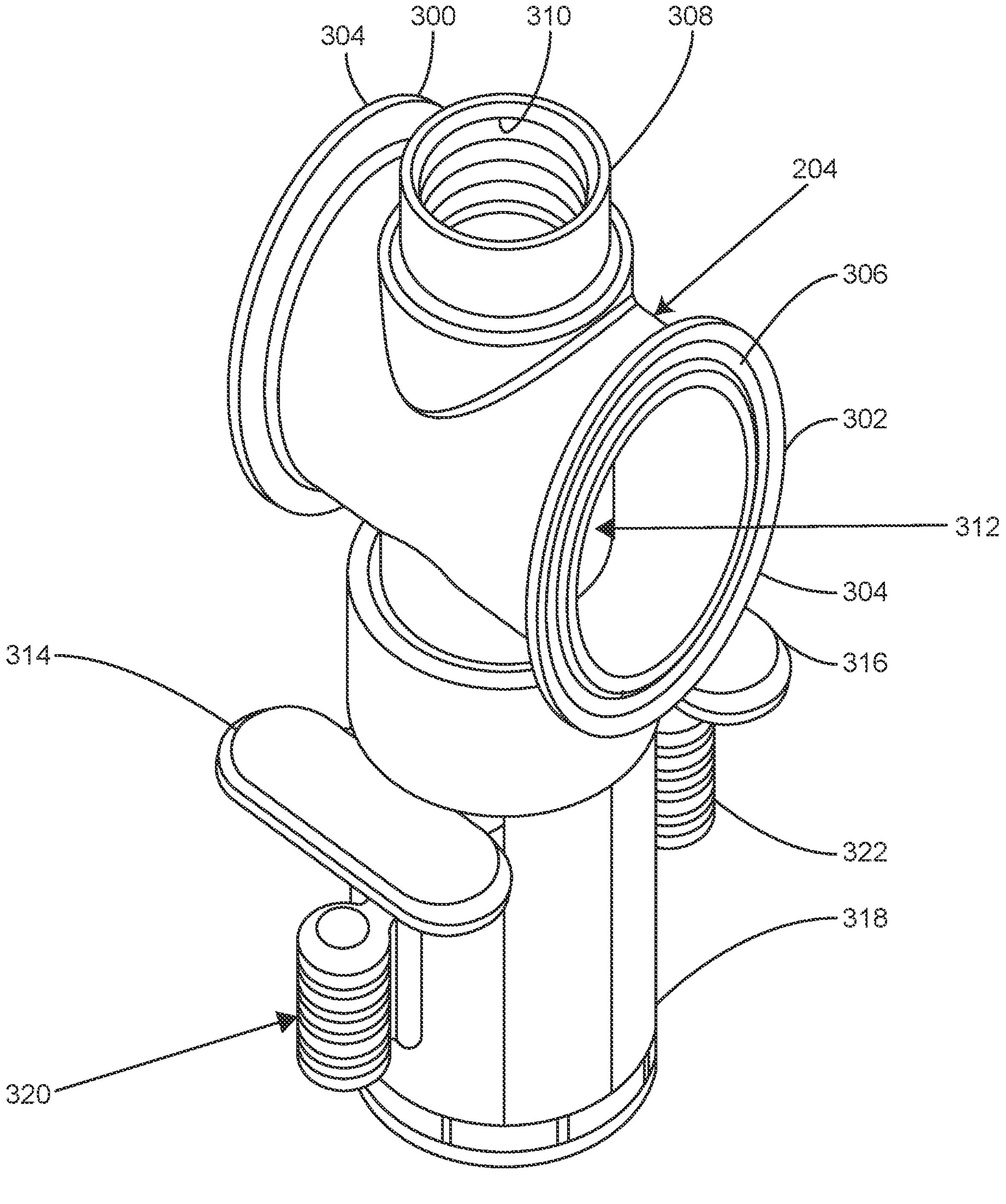
FIGS. 6-8 are diagrammatic views of process connections having wet sensor storage chambers in accordance with embodiments of the present invention.
Figure 7:
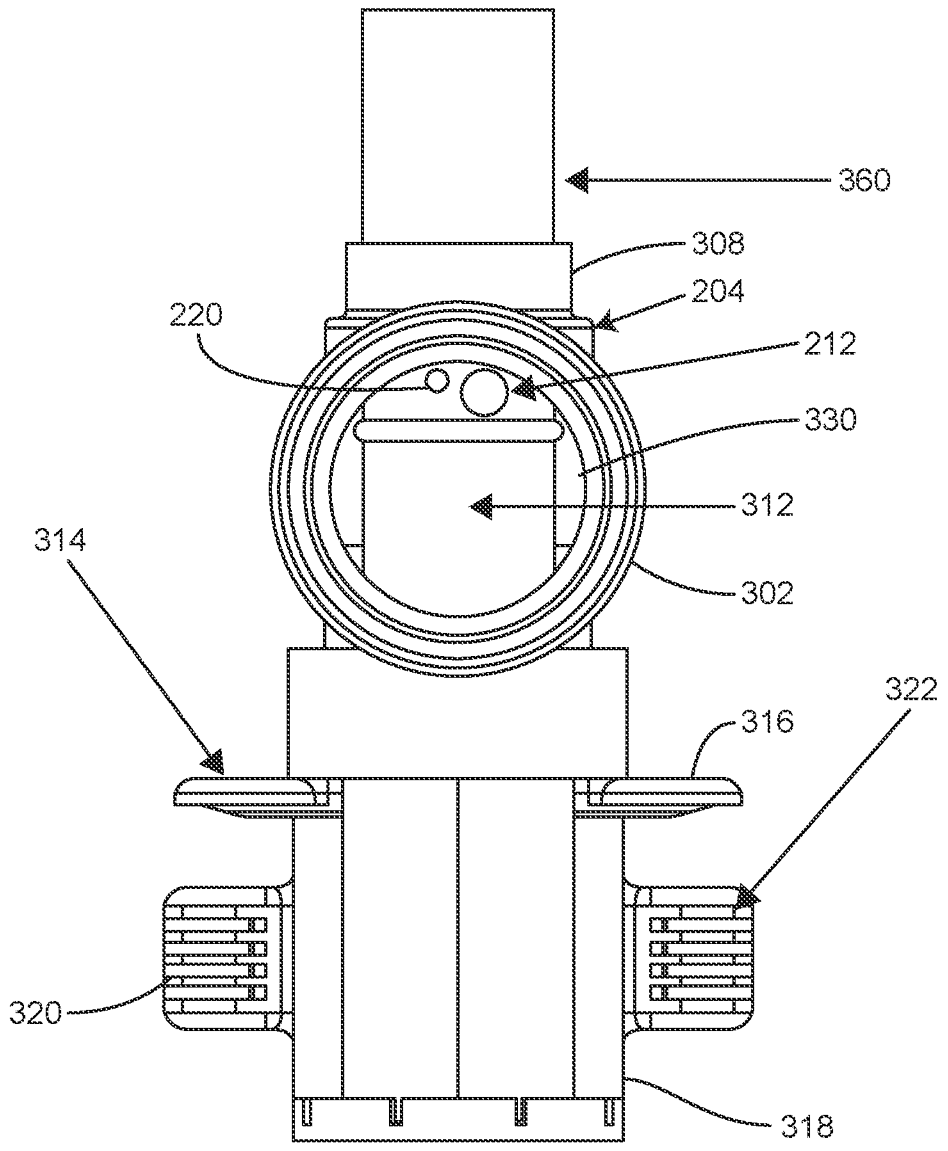
Figure 8:
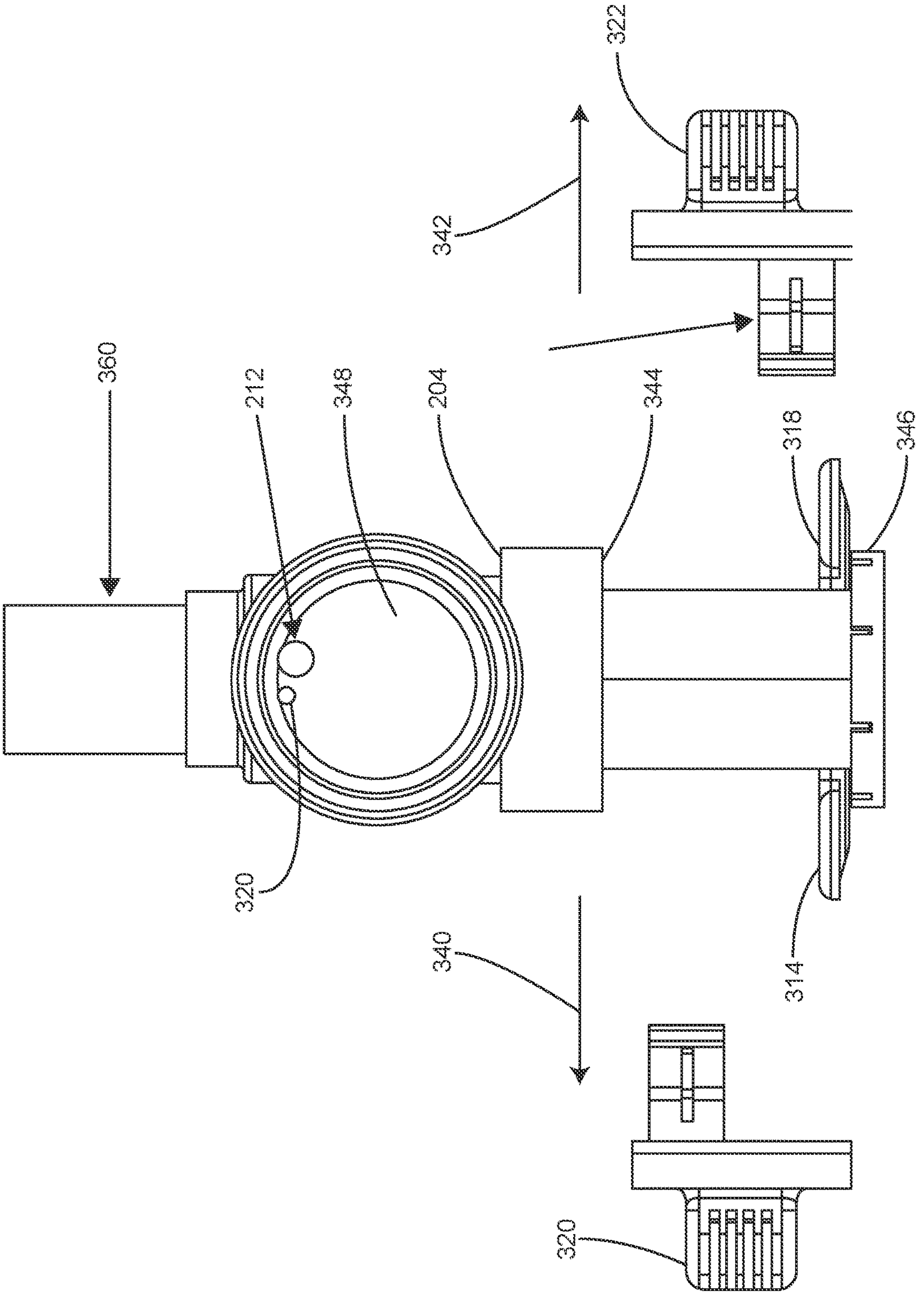

FIGS. 6-8 are diagrammatic views of process connections having wet sensor storage chambers in accordance with embodiments of the present invention.

FIG. 6 is a diagrammatic perspective view of a process connector for a single-use pH sensing system in accordance with an embodiment of the present invention. The illustrated example is a specialized process connection where the sensor is mounted and has a sliding tube that can enclose the process end of the sensor and provides a sealed wet storage chamber. Process connector 204 generally includes a pair of process fluid connections 300 and 302. In the example illustrated in FIG. 6, process connection 300 is an inlet, and process connection 302 is an outlet. As shown, each of process fluid connections 300, 302 generally includes a flange 304 that, in one embodiment, is a sanitary flange that may also include an O-ring 306 to facilitate a seal to a corresponding sanitary flange. A process fluid conduit section 301 is interposed between and fluidically couples process fluid connections 300, 302 together. While the embodiment illustrated in FIG. 6 includes a pair of flange connections, the connections need not be of the same type of connection. The connections can take various forms including, without limitation, a threaded connection, a flanged connection (as shown), a barbed connection, an aseptic connection, an open pipe section, attached tubing, and a secondary adapter.

A sensor mount port 308 is fluidically interposed between process fluid connections 300, and 302. Sensor mount port 300 is configured to receive and mount a fixed-position pH sensor, such as that shown in FIG. 4. In one embodiment, sensor mount port 308 includes internal threads 310 to threadably engage external threads of a fixed position pH sensor. Process connector 204 has both a storage and an operating configuration. As shown in FIG. 6, process connector 204 is in a storage configuration where a wet storage cylinder 312 is in a closed position. In this configuration, the pH sensor element of the fixed-position pH sensor that would be coupled to sensor mount port 308 is isolated from process fluid flow. Additionally, a buffer solution having a known pH is provided within the wet storage cylinder 312 (shown in greater detail in later figures) to maintain the pH sensor in wet storage and also to provide a single point calibration prior to operation.

As shown in FIG. 6, process connector 204 includes one or more actuatable members 314, 316. In the illustrated example, actuatable members 314, 316 are a pair of oppositely extending wings that extend substantially perpendicularly from the longitudinal axis of wet storage cylinder 318. Additionally, process connector 204 also includes one or more wet storage chamber position locks 320, 322. These locks 320, 322 ensure that inadvertent downward pressure on actuatable members 314, 316 will not result in movement or actuation of actuatable members 314, 316 downwardly, which would expose the pH sensitive elements to the process fluid.

FIG. 7 is a front elevation view of a process connector 204 engaged with a fixed-position pH sensor 360 in sensor port 308 where process connector 204 is in a closed position. In this configuration, wet storage cylinder 312 isolates pH sensitive element 212 and reference junction 220 (illustrated diagrammatically as circles) from process fluid flowing through region 330.

As shown in FIGS. 6 and 7, this storage chamber provides wet storage for the pH glass and reference junction of the pH sensor. The assembled system consists of a fixed position pH sensor, a fixed position piston opposing the sensor and a moveable cylindrical member. The moveable member slides completely out of the process flow stream which results in minimal dead flow volume. Along with various O-rings to seal the moveable member to the fixed members, this solution provides a self-contained wet pH sensor storage with minimal flow obstruction. This entire assembly can be connected to a tube set at the OEM and gamma sterilized.

FIG. 8 is a diagrammatic view of process fluid connector 204 that has been transitioned to an operating position. As shown in FIG. 8, each of wet storage chamber position locks 320, 322 has been moved from their respective positions in the directions indicated by arrows 340, 342, respectively. With wet storage chamber position locks 320 and 322 removed, wings 314 and 318 are able to translate from a position proximate shoulder 344 all the way to bottom 346. When this occurs, wet storage cylinder 312 is also translated axially down thereby exposing pH glass electrode 212 and reference junction 220 to process fluid within conduit 348.

Figure 9:
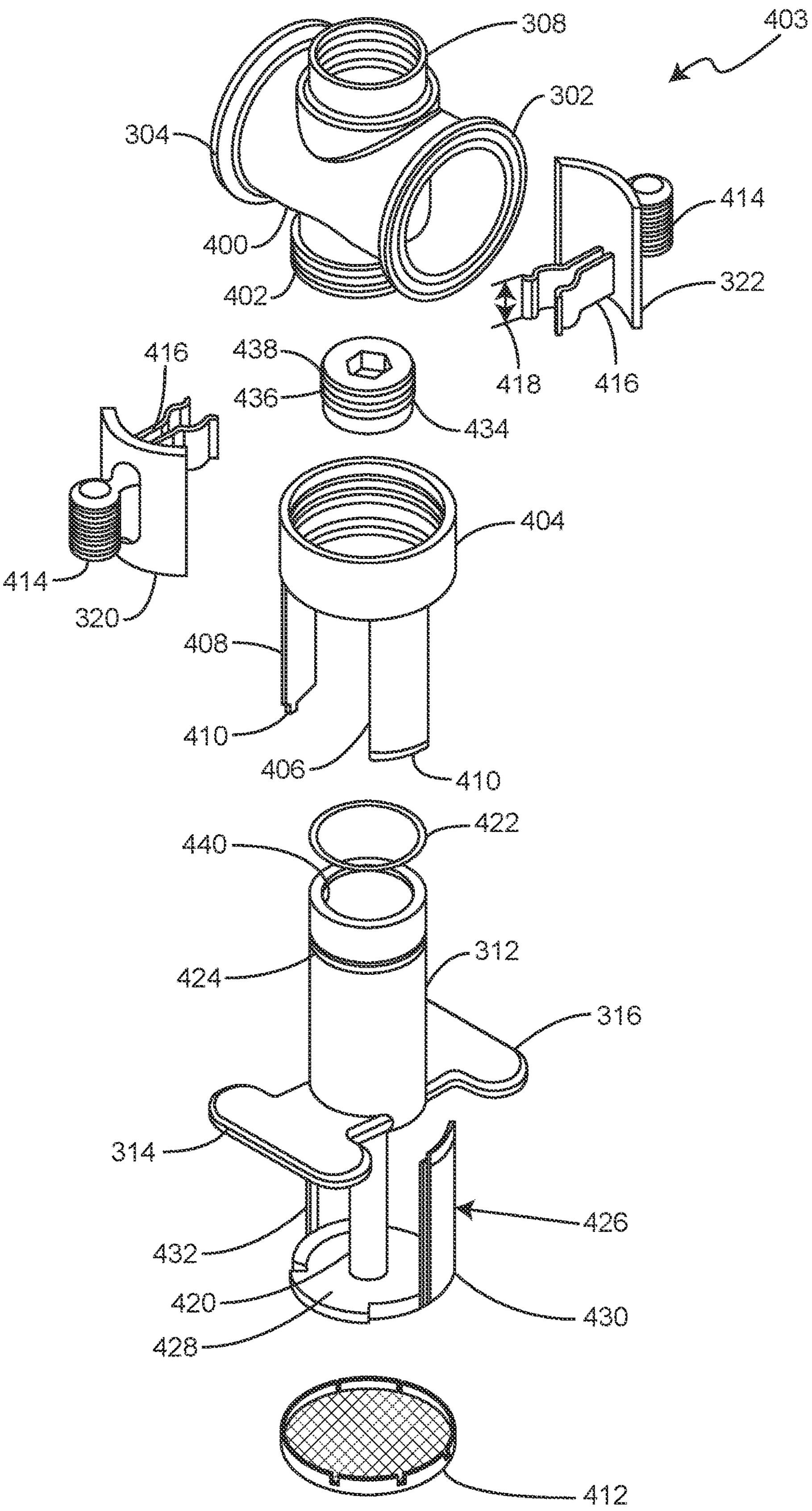
FIG. 9 is an exploded view of a process connection with wet storage chamber in accordance with an embodiment of the present invention.

FIG. 9 is a diagrammatic exploded view of a process fluid connector for a single-use sanitary pH sensing system in accordance with an embodiment of the present invention. Process connector 403 includes main body 400 including inlet 304 and outlet 302. Main body 400 also includes sensor port 308 that, in the illustrated example, includes an internally threaded portion to receive a fixed-position pH sensor. Main body 400 also includes a lower externally-threaded portion 402 that is configured to threadably engage collar 404. Collar 404 includes a pair of circular side wall portions 406, 408, extending downwardly therefrom. Each of circular side wall portions 406, 408 includes an engagement feature 410 that is configured to engage endcap 412 when the system is assembled. Process connector 403 is illustrated having a pair of wet storage chamber position locks 320, 322. Each of position locks 320, 322 includes a handle portion 414 that facilitates gripping by a user. Additionally, each of position locks 320, 322, preferably includes a clip 416 extending inwardly therefrom. As shown in FIG. 9, each clip 416 preferably has a width 418 that is approximately one half the width of the entire position lock. Thus, when opposing position locks 320, 322 engage shaft 420, the amount of motion inhibited by position locks 320, 322 is two widths 418.

Process connector 403 includes wet storage cylinder 312 coupled to a pair of wings 314, 316. Additionally, an O-ring 422 is configured to be positioned within O-ring groove 424 to help isolate the pH sensing elements from the process when the process connector is in the storage configuration.

Process connector 403 also includes lower housing 426 having an end 428 and a pair of upwardly extending circular side wall portions 430, 432. Additionally, shaft 420 is mounted in the center of end 428. Shaft 420 includes an end that is mounted to fixed piston end 434. In one example, fixed piston end 434 includes a threaded aperture that engages an externally threaded portion of shaft 420 to mount piston end 434 to shaft 420. Piston end 434 includes one or more 0-ring seals 436, 438 that seal against an internal surface 440 of wet storage cylinder 312.

Figure 10:
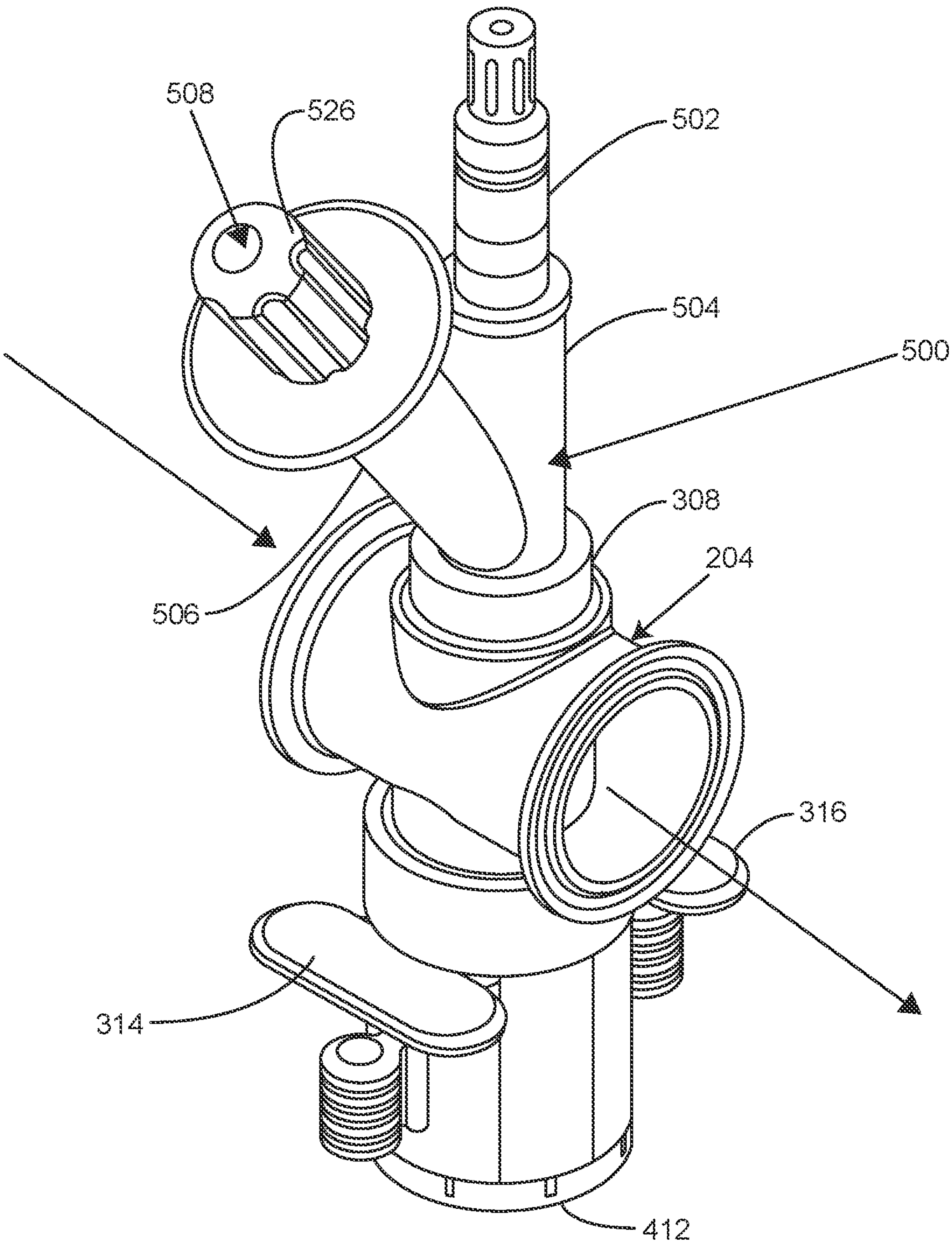
FIG. 10 is a diagrammatic view of a single-use pH downstream pH sensor in accordance with an embodiment of the present invention.

FIG. 10 is a diagrammatic perspective view of a single-use, sanitary, pH sensing system in accordance with an embodiment of the invention. FIG. 10 illustrates a fixed position sensor 500 coupled to sensor port 308. As shown, wings 314, 316, are spaced away from endcap 412, and thus the process connector 204 is in the storage position. Fixed position pH sensor 502 includes cylindrical sidewall 504 that extends upwardly from sensor port 308. Sensor 500 also includes an inclined sidewall 506 that houses a point-of-use pressure applicator 508. Point of use pressure applicator 508 is used just prior to operation of the pH sensing system to pressurize the reference electrode in order to support downstream applications. In one embodiment, the pressurization may simply be the release of a mechanism that is spring-biased to generate a pre-selected pressure within the reference electrolyte, such as 60 PSI. In other examples, the point-of-use pressure applicator may be adjustable, such as a threaded applicator, that can generate a user-selectable level of pressure within the reference electrolyte. Regardless, the utilization of a point-of-use applicator allows the system to be stored in a non-pressurized state and then pressurized just prior to operation.

Figure 11:
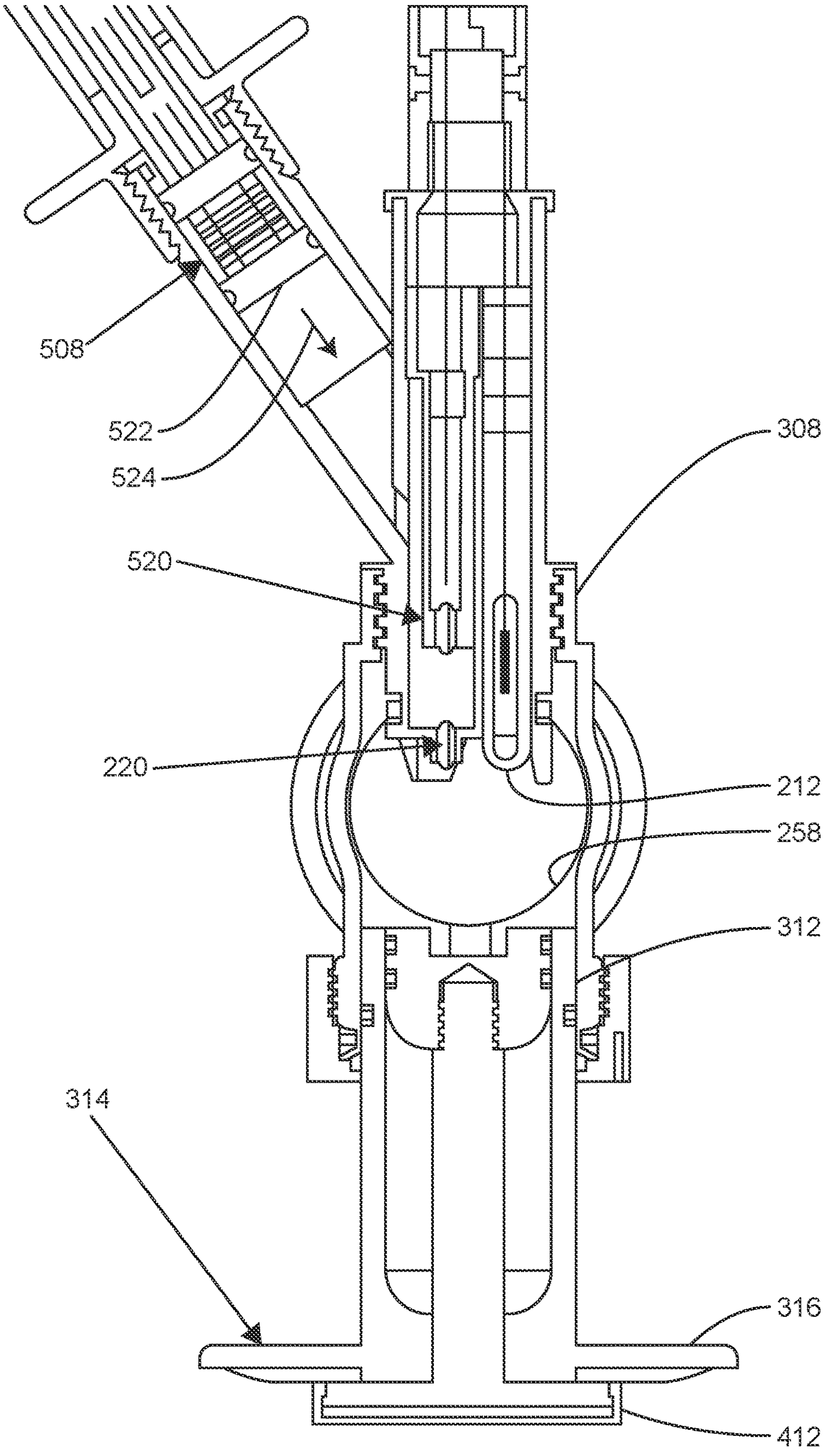
FIG. 11 is a diagrammatic section view of a process connection with wet storage chamber in accordance with an embodiment of the present invention.

FIG. 11 is a diagrammatic cross-sectional view of a single-use sanitary downstream pH measurement system in accordance with an embodiment of the present invention. While FIG. 10 shows the system in a storage configuration, FIG. 11 shows the system in an operational configuration. Accordingly, wings 314 and 316 have been translated, or otherwise displaced all the way to endcap 412 thereby sliding wet storage cylinder 312 into a retracted position allowing pH sensing element 212 and reference junction 220 to be in fluidic communication with process fluid passageway 258. Additionally, FIG. 11 illustrates a reference electrode 520 disposed proximate reference junction 220. Reference pressurization mechanism 508 is illustrated having a plunger 522 disposed therein which is movable in the direction indicated at reference numeral 524. Movement of plunger 522 in the direction of arrow 524 generates pressure within the reference electrolyte. The plunger may be released by twisting knob 526 (shown in FIG. 10). Additionally, the pressure may be selected by rotating knob 526 until a desired pressure is achieved within the reference electrolyte.

Wet pH glass storage is important for single-use applications because the extended (2-year) shelf life is a requirement for upstream bag manufacturers as well as downstream tube set manufacturers. It is believed that embodiments disclosed herein provide a single-use pH solution that fulfills the requirements of today's single-use downstream market. Referring to FIGS. 10 and 11, actuation of the wet storage chamber can be done in several ways. In one example, the cylindrical member is pulled away axially from the fixed sensor by hand. (See FIG. 11). In another example the user pushes or pulls the cylinder from the same side the fixed sensor is attached to. Preferably, the actuation of the wet storage chamber is done without breaching a sterile process barrier of the downstream process fluid connector Although the present invention has been described with reference to preferred embodiments, workers skilled in the art will recognize that changes may be made in form and detail without departing from the spirit and scope of the invention.

What is claimed is:

1. A fluid sensing system comprising:

a pair of fluid connections, each fluid connection being configured to couple to a cooperative fluid coupling;

a fluid conduit section fluidically coupled to the pair of fluid connections, the fluid conduit section being configured to allow fluid to be sensed to flow therethrough;

a sensor attachment port coupled to the fluid conduit section;

a fixed-position amperometric fluid sensor mounted to the sensor attachment port, the fixed-position amperometric fluid sensor having at least one sensing element mounted in a fixed position within the fluid conduit section; and a movable fluid chamber coupled to the fluid conduit section.

2. The system of claim 1, wherein the movable fluid chamber is movable without breaching a sterile process barrier of the downstream fluid connector.

3. The system of claim 1, wherein the movable fluid chamber is operably coupled to at least one user actuatable elements.

4. The system of claim 3, wherein the at least one user actuatable elements includes a pair of wings extending from opposite sides of the movable fluid chamber, the pair of wings being configured to transition the movable fluid chamber from a storage configuration to an operating configuration.

5. The system of claim 4, and further comprising at least one locking member operably coupled to at least one actuatable elements, the at least one locking member being configured to inhibit displacement of the at least one user actuatable element.

6. The system of claim 5, wherein the at least one locking member includes a pair of locks, each lock being offset with the other lock, and requiring removal of the pair of locks before enabling displacement of the user actuatable elements to the operating configuration.

7. The system of claim 1, wherein the movable fluid chamber contains a buffer solution having a known pH.

8. The system of claim 1, wherein each of the pair of fluid connections includes a sanitary flange.

9. The system of claim 8, wherein each sanitary flange includes an o-ring groove configured to receive an o-ring.

10. The system of claim 1, and further comprising:

an endcap;

a shaft mounted to the endcap at a distal end and proximal end spaced from the distal end; and a fixed-position piston mounted to the proximal end of the shaft, the fixed position piston having a diameter sized to cooperate with an internal surface of a wet storage cylinder of the movable fluid chamber.

11. The system of claim 10, and further comprising at least one o-ring disposed about an exterior diameter of the fixed-fixed-position piston.

12. The system of claim 10, and further comprising an o-ring disposed about an exterior diameter of the wet storage cylinder.

13. The system of claim 1, wherein a moveable member of the movable fluid chamber is configured to slide completely out of a fluid flow stream of the fluid conduit section.

14. The system of claim 1, wherein at least one of the pair of fluid connections is selected from the group consisting of: a threaded connection, a flanged connection, a barbed connection, an ascetic connection, an open pipe section, attached tubing, and a secondary adapter.

15. A fluid sensing system comprising:

fluid connector including, a pair of fluid connections, each fluid connection being configured to couple to a cooperative fluid coupling;

a fluid conduit section fluidically coupled to each of the fluid connections;

a sensor attachment port;

a movable fluid chamber coupled to the fluid conduit section;

a fixed-position amperometric fluid sensor mounted to the sensor attachment port of the fluid connector, the fixed-position amperometric fluid sensor having a plurality of sensing elements disposed within a buffer solution within the movable fluid chamber; and wherein the movable fluid chamber provides wet storage for a sensing component of the fixed-position amperometric fluid sensor.

16. The fluid sensing system of claim 15, wherein the fixed-position amperometric process fluid sensor is configured to be pressurized at a point of use.

17. The fluid sensing system of claim 16, wherein the fixed-position amperometric fluid sensor includes a pressurization mechanism that is configured to be manually operated to pressurize a reference electrolyte of the fixed-position fluid sensor.

18. The fluid sensing system of claim 17, wherein the pressurization mechanism includes a spring-biased piston.

19. The fluid sensing system of claim 18, wherein the pressurization mechanism includes a manually operable knob that is configured to engage the pressurization mechanism.

20. The fluid sensing system of claim 19, wherein the knob is configured to generate a user-selectable amount or pressure in the reference electrolyte.

* * * * *